(12) United States Patent
Gutkin et al.

(10) Patent No.: US 9,424,835 B2
(45) Date of Patent: Aug. 23, 2016

(54) STATISTICAL UNIT SELECTION LANGUAGE MODELS BASED ON ACOUSTIC FINGERPRINTING

(71) Applicant: Google Inc., Mountain View, CA (US)

(72) Inventors: Alexander Gutkin, Cambridge (GB); Javier Gonzalvo Fructuoso, London (GB); Cyril Georges Luc Allauzen, Long Island City, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/850,249

(22) Filed: Sep. 10, 2015

(65) Prior Publication Data

US 2016/0093295 A1  Mar. 31, 2016

Related U.S. Application Data

(60) Provisional application No. 62/057,588, filed on Sep. 30, 2014.

(51) Int. Cl.
*G10L 15/08* (2006.01)
*G10L 15/06* (2013.01)
*G10L 19/018* (2013.01)
*G10L 13/08* (2013.01)

(52) U.S. Cl.
CPC ............... *G10L 15/063* (2013.01); *G10L 13/08* (2013.01); *G10L 19/018* (2013.01)

(58) Field of Classification Search
USPC ................................ 704/200, 200.1, 237–240
See application file for complete search history.

(56) References Cited

U.S. PATENT DOCUMENTS

2011/0153050 A1* 6/2011 Bauer .................. G10L 19/018
                                                    700/94
2015/0019220 A1* 1/2015 Talhami ................ G10L 15/063
                                                    704/244

OTHER PUBLICATIONS

Allauzen et al., "Statistical Modeling for Unit Selection in Speech Synthesis," ACL '04 Proceedings of the 42nd Annual Meeting on Association for Computational Linguistics, Article No. 55, 2004, 8 pages.
Cano et al., "Robust Sound Modeling for Song Detection in Broadcast Audio," in Proc. Audio Engineering Society 112th International Convention, May 2002, pp. 1-7.
Doets, "Modeling Audio Fingerprints: Structure, Distortion, Capacity," PhD thesis, Technical University of Delft, Oct. 2010, 175 pages.
Haitsma and Kalker, "A Highly Robust Audio Fingerprinting System," ISMIR 2002, Oct. 2002, pp. 107-115.

* cited by examiner

*Primary Examiner* — Marcellus Augustin
(74) *Attorney, Agent, or Firm* — Fish & Richardson P.C.

(57) ABSTRACT

Methods, systems, and apparatus, including computer programs encoded on computer storage media, for providing statistical unit selection language modeling based on acoustic fingerprinting. The methods, systems and apparatus include the actions of obtaining a unit database of acoustic units and, for each acoustic unit, linguistic data corresponding to the acoustic unit; obtaining stored data associating each acoustic unit with (i) a corresponding acoustic fingerprint and (ii) a probability of the linguistic data corresponding to the acoustic unit occurring in a text corpus; determining that the unit database of acoustic units has been updated to include one or more new acoustic units; for each new acoustic unit in the updated unit database: generating an acoustic fingerprint for the new acoustic unit; identifying an acoustic unit that (i) has an acoustic fingerprint that is indicated as similar to the fingerprint of the new acoustic unit, and (ii) has a stored associated probability.

17 Claims, 3 Drawing Sheets

STATISTICAL UNIT SELECTION LANGUAGE MODELS BASED ON ACOUSTIC FINGERPRINTING

CROSS-REFERENCE TO RELATED APPLICATIONS

This application claims the benefit of U.S. Provisional Application No. 62/057,588, filed Sep. 30, 2014, which is incorporated herein by reference.

TECHNICAL FIELD

This disclosure generally relates to acoustic unit sequence modeling.

BACKGROUND

Text-to-speech synthesis systems are used to produce artificial human speech. Often, synthesized speech can be created by concatenating pieces of recorded speech that are stored in some database. Unit selection speech synthesis is one type of text-to-speech synthesis which builds a statistical language model representing the probability of a certain sequence of acoustic units. A unit selection synthesis system creates a large database of recorded speech, where each recorded utterance is segmented into individual phones, or acoustic units. An index of the acoustic units in the database is then created based on the segmentation and various acoustic parameters. At run time, the synthesizer selects a sequence of acoustic units by determining and selecting the best chain of candidate acoustic units from the database.

SUMMARY

In general, an aspect of the subject matter described in this specification may involve a process for synthesizing speech using a unit selection synthesis system. The system may obtain a database of recorded training utterances and output a probabilistic language model that can be efficiently encoded in a finite state transducer framework to enable speech synthesis.

In order to estimate the probabilistic language model that is encoded in the finite state transducer (FST) framework, the unit selection synthesis system may first require access to a large database of training utterances. This may be provided to the system, for example, using a high-quality synthesis engine that may be used to synthesize a very large corpus of text, such as the text found in the entire English-language Wikipedia database. The synthesized utterances may then be segmented into individual phones, or acoustic units. The acoustic units can be stored in the training utterances database along with any corresponding linguistic information.

The acoustic units in the training utterances database can be indexed using some corresponding acoustic unit identity. For example, the unit identities can take some sequential integer identities. The system can also use other notions of identities, for example an acoustic fingerprint.

For each indexed acoustic unit in the training utterances database, the system may estimate a probability of the acoustic unit occurring in a new corpus of text, thus determining a complete probabilistic language model. The individual probability estimations can be achieved, for example, using statistical language modeling techniques. The system can associate the probability estimations with their corresponding acoustic unit and acoustic unit index in data triples which may be stored in a data store. A finite state transducer framework can access at least a portion of the stored data triples to enable speech synthesis.

At times, the unit selection synthesis system may receive an update to the training utterances database. For example, in some production environments linguistic and acoustic changes to the recorded training utterances database can be frequent. In order to obtain an accurate and reliable speech output it is imperative that the finite state transducer framework is provided with reliable statistical estimates of the acoustic units. By simply adding or removing acoustic units from the data store that feeds the finite state transducer framework, the system could become unreliable and may be prone to selecting invalid audio and linguistic features resulting in bad speech synthesis. However, rebuilding the probabilistic language model from an updated training utterances database that can include updated acoustic units is costly both regarding time and the required computational resources.

The system may avoid rebuilding the probabilistic language model from an updated training utterances database in such scenarios. Instead, the system may generate acoustic fingerprints of the acoustic units and introduce similarity measures to replace hardcoded database-specific acoustic unit identities. Such a use of acoustic fingerprints and similarity measures can ensure that the originally recorded training utterances database remains persistent, thus allowing for infrequent estimation of the probabilistic language model whilst accommodating additional and potentially frequent linguistic and acoustic updates.

The system may proceed as above, obtaining a database of recorded training utterances segmented into individual acoustic units. The system may index the database by generating an acoustic fingerprint of each acoustic unit. For each indexed acoustic unit in the training utterances database the system may estimate a probability of the acoustic unit occurring in a new corpus of text, thus determining a complete probabilistic language model. Should the system receive a training utterances database update, the system may calculate a new set of acoustic fingerprints for each updated acoustic unit.

To obtain an estimate for the associated probability of the updated acoustic unit occurring in the new corpus of text, the system may need not to estimate an entirely new probabilistic model incorporating both the original set of acoustic units and the updated acoustic units. Rather, the system may instead define a similarity measure between the acoustic fingerprints of two acoustic units. The system may then select the most similar acoustic fingerprint of an original acoustic unit to the new acoustic fingerprint of the updated acoustic unit. Once this similar acoustic fingerprint and corresponding original acoustic unit has been identified, the system can associate the corresponding probability estimate of the original acoustic unit occurring in the new corpus of text to the updated acoustic unit and acoustic fingerprint in a data triple. The newly generated data triples comprising an updated acoustic unit, acoustic fingerprint of the updated acoustic unit and previously estimated corresponding probability can be stored in an additional data store. A finite state transducer framework can access at least a portion of the stored data triples in both data stores to enable speech synthesis.

In some aspects, the subject matter described in this specification may be embodied in methods that may include the actions of obtaining a unit database of acoustic units and, for each acoustic unit, linguistic data corresponding to the acoustic unit. Additional actions include, for each acoustic unit: generating an acoustic fingerprint; determining a probability of the linguistic data corresponding to the acoustic unit occurring in a text corpus; and storing data that associates the acoustic unit with (i) the acoustic fingerprint of the acoustic unit and (ii) the probability of the linguistic data corresponding to the acoustic unit occurring in the text corpus. Further actions include providing at least a portion of the stored data to a finite state transducer training engine that is configured to train one or more finite state transducers that are used in generating speech from text; determining that the unit database of acoustic units has been updated to include one or more new acoustic units; for each new acoustic unit in the updated unit database: generating an acoustic fingerprint for the new acoustic unit; identifying an acoustic unit that (i) has an acoustic fingerprint that is indicated as similar to the fingerprint of the new acoustic unit, and (ii) has a stored associated probability; storing data that associates the new acoustic unit with (i) the acoustic fingerprint of the new acoustic unit and (ii) the probability associated with the acoustic unit that has the acoustic fingerprint that is indicated as similar to the fingerprint of the new acoustic unit; and providing at least a portion of the new stored data to the finite state transducer training engine.

Other versions include corresponding systems, apparatus and computer programs, configured to perform the actions of the methods, encoded on computer storage devices.

These and other versions may each optionally include one or more of the following features. For instance, in some implementations the generated acoustic fingerprint for each acoustic unit indexes the unit database.

In additional aspects the linguistic data is a tri-phone.

In some implementations the unit database is considered to be updated when new acoustic units have been added or existing acoustic units have been deleted.

In certain aspects a new acoustic unit is an acoustic unit that did not exist prior to the database update.

In additional aspects determining that the unit database has been updated comprises determining that the unit database includes acoustic units that do not have an associated probability of the linguistic data corresponding to the acoustic unit occurring in the text corpus.

In some implementations identifying an acoustic unit that has an acoustic fingerprint that is indicated as similar to the fingerprint of the new acoustic unit comprises: calculating a respective similarity measure between the acoustic fingerprints of the new acoustic units and the acoustic fingerprints of each other acoustic unit in the unit database; determining a nearest acoustic fingerprint to the acoustic fingerprint of the new acoustic units according to the similarity measure; and identifying the acoustic unit associated with the nearest acoustic fingerprint.

In certain aspects the similarity measure is a Hamming distance measuring the minimum number of errors that could have transformed one fingerprint into another.

Particular embodiments can be implemented, in certain instances, to realize one or more of the following advantages. Given a large acoustic unit inventory and a high-quality acoustic unit selection synthesizer, a highly accurate, reliable probabilistic model of unit sequences selected from the inventory may be built and maintained. This highly accurate probabilistic model may be used in a finite state transducer framework, for example, for the development of future synthesizers. In particular, the present subject matter may enable the building of a very large footprint and very high-quality synthesis system without the need to optimize the system for memory or disk footprint.

In a production critical environment where many linguistic and acoustic changes may be made to existing linguistic databases, the high-quality synthesis system constructed by the disclosed methods may allow for bootstrapping highly optimized, mathematically principled synthesis systems very quickly and efficiently without having to worry about databases being completely synchronized. By obtaining a model of unit sequences once and re-using the information in future builds of acoustic unit selection systems, the computational resources and memory required by the system may be reduced, whilst the runtime performance may be increased.

The details of one or more implementations of the subject matter described in this specification are set forth in the accompanying drawings and the description below. Other potential features, aspects, and advantages of the subject matter will become apparent from the description, the drawings and the claims.

DESCRIPTION OF DRAWINGS

Like reference symbols in the various drawings indicate like elements.

DETAILED DESCRIPTION

Figure 1:
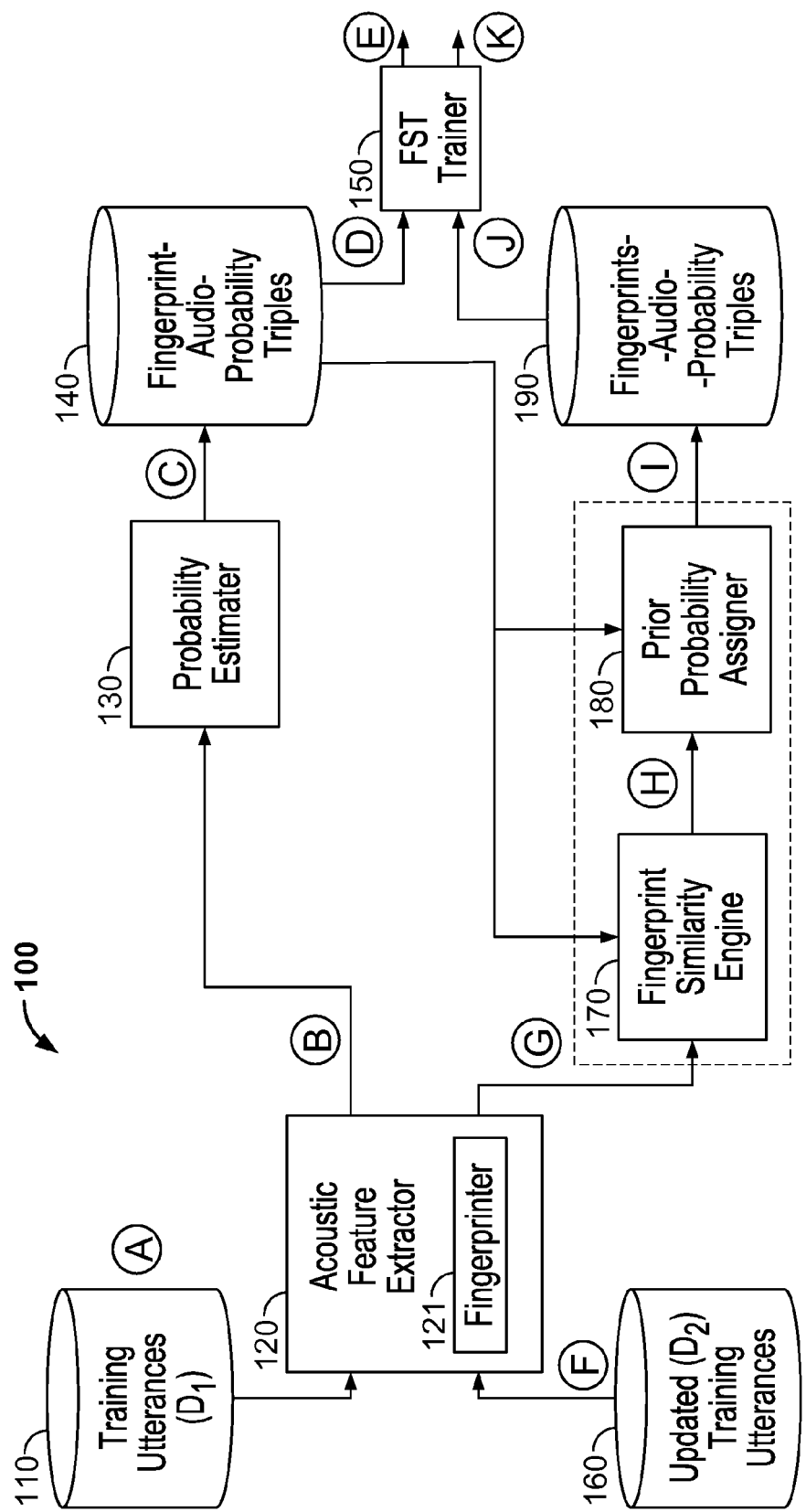
FIG. 1 is a block diagram of an example system for unit selection language modeling based on acoustic fingerprinting.

In general, an aspect of the subject matter described in this specification may involve a process for synthesizing speech using a unit selection synthesis system. The system may obtain a database of recorded training utterances and output a probabilistic language model that can be efficiently encoded in a finite state transducer framework to enable speech synthesis.

In order to estimate the probabilistic language model that is encoded in the finite state transducer framework, the unit selection synthesis system may first require access to a large database of training utterances. This may be provided to the system using standard techniques, for example a high-quality synthesis engine may be used to synthesize a gigantic corpus of text, for example the entire English Wikipedia. The synthesized utterances may then be segmented into individual phones, or acoustic units. The acoustic units can be stored in the training utterances database along with any corresponding linguistic information.

The acoustic units in the training utterances database can be indexed via some corresponding acoustic unit identity. For example, in some classical and statistical approaches to unit selection speech synthesis the unit identities can be assumed to take some sequential integer identities. The system can also use other notions of identities, for example an acoustic fingerprint.

For each indexed acoustic unit in the training utterances database the system may estimate a probability of the acoustic unit occurring in a new corpus of text, thus determining a complete probabilistic language model. The individual probability estimations can be achieved, for example, using standard statistical language modeling techniques. The system can associate the probability estimations with their corresponding acoustic unit and acoustic unit index in data triples which may be stored in a data store. A finite state transducer framework can access at least a portion of the stored data triples to enable speech synthesis.

At times, the unit selection synthesis system may receive an update to the training utterances database. For example, in some production environments linguistic and acoustic changes to the recorded training utterances database can be frequent. In order to obtain an accurate and reliable speech output it is imperative that the finite state transducer framework is provided with reliable statistical estimates of the acoustic units. By simply adding or removing acoustic units from the data store that feeds the finite state transducer framework, the system could become unreliable and may be prone to selecting invalid audio and linguistic features resulting in bad speech synthesis. However, rebuilding the probabilistic language model from an updated training utterances database that can include updated acoustic units is costly both regarding time and the required computational resources.

The system may avoid rebuilding the probabilistic language model from an updated training utterances database in such scenarios. Instead, the system may generate acoustic fingerprints of the acoustic units and introduce similarity measures to replace hardcoded database-specific acoustic unit identities. Such a use of acoustic fingerprints and similarity measures can ensure that the originally recorded training utterances database remains persistent, thus allowing for infrequent estimation of the probabilistic language model whilst accommodating additional and potentially frequent linguistic and acoustic updates.

The system may proceed as above, obtaining a database of recorded training utterances segmented into individual acoustic units. The system may index the database by generating an acoustic fingerprint of each acoustic unit. For each indexed acoustic unit in the training utterances database the system may estimate a probability of the acoustic unit occurring in a new corpus of text, thus determining a complete probabilistic language model. Should the system receive a training utterances database update, the system may calculate a new set of acoustic fingerprints for each updated acoustic unit.

To obtain an estimate for the associated probability of the updated acoustic unit occurring in the new corpus of text, the system may need not to estimate an entirely new probabilistic model incorporating both the original set of acoustic units and the updated acoustic units. Rather, the system may instead define a similarity measure between the fingerprints of two acoustic units. The system may then identify the most similar acoustic fingerprint of an original acoustic unit to the new acoustic fingerprint of the updated acoustic unit. Once this similar acoustic fingerprint and corresponding original acoustic unit has been identified, the system can assign the corresponding probability estimate of the original acoustic unit occurring in the new corpus of text to the updated acoustic unit and acoustic fingerprint in a data triple. The newly generated data triples comprising an updated acoustic unit, similar acoustic fingerprint and assigned probability can be stored in an additional data store. A finite state transducer framework can access at least a portion of the stored data triples in both data stores to enable speech synthesis.

FIG. 1 is a block diagram of an example system 100 for modeling audio sequences. Generally, the system 100 may include a database of recorded training utterances 110 that stores recorded utterances of speech segmented into acoustic units, an acoustic feature extractor 120, which includes a fingerprinter 121, that receives the acoustic units and generates an acoustic unit index, a probability estimator 130 that receives the indexed acoustic units and determines the probability of each acoustic unit occurring in a corpus of text, a database 140 that stores the acoustic unit, its corresponding index and determined probability of occurrence in data triples, and a FST trainer 150 that uses the stored data triples to generate synthesized speech. The system may further include a database of updated recorded training utterances 160 that stores updated recorded utterances of speech segmented into acoustic units, a fingerprint similarity engine 170 that compares acoustic fingerprints of differing acoustic units and identifies similar acoustic fingerprints, a prior probability assigner 180 that assigns an existing probability estimate of occurrence of an acoustic unit in a corpus of text to the updated acoustic units, and a database 190 that stores the updated acoustic unit, its identified similar acoustic fingerprint and assigned probability of occurrence in data triples.

The database of training utterances 110 may include recorded utterances that can be stored in association with linguistic data. Each recorded utterance may be segmented into individual phones, or acoustic units. For example, the database of training utterances may include an acoustic unit that is a recording of a human pronouncing the phone "/s/" in the text "salt". The associated linguistic data corresponding to the acoustic units can include information about parts of speech, supra-segmental phonological information, articulation features and so on. For example, the database of training utterances may also include a recording of a human pronouncing the phone "/s/" in the text "post". The phone "/s/" preceded by silence and followed by the phone "/a/" may sound slightly different from the phone "/s/" preceded by the phone "/o/" and followed by the phone "/t/".

The acoustic feature extractor 120 may access the training utterances database 110 (in stage A) and index the acoustic units according to some acoustic unit identity. For example, the acoustic unit identities can be assumed to take some sequential integer identities. The acoustic feature extractor 120 may also include a fingerprinter 121 that can generate an acoustic fingerprint for each acoustic unit using an acoustic fingerprinting algorithm. The acoustic fingerprints may act as an index for the database of acoustic units. An acoustic fingerprint is a condensed, digital summary of an acoustic unit and may be used as an acoustic unit identifier. For example, the fingerprints may be represented as fixed-length, integer valued vectors. The complete set of acoustic fingerprints may act as an index for the database of acoustic units. There exist many acoustic fingerprinting algorithms that could be implemented by the fingerprinter 121 to generate the acoustic fingerprints for the acoustic units. For an overview of such fingerprinting algorithms, we refer to CANO et al. 'Audio fingerprinting: concepts and applications'. In: Computational intelligence for modeling and prediction. Springer Berlin Heidelberg, 2005, p. 233-245.

The indexed acoustic units can be sent to a probability estimator 130 (stage B). The probability estimator calculates the probabilities of each acoustic unit occurring in some text corpus, generating a probabilistic language model. Several standard statistical language modeling techniques may be employed to generate the probabilistic language model, for example one approach to unit selection speech synthesis is described in ALLAUZEN et al. 'Statistical modeling for unit selection in speech synthesis'. In: Proceedings of the 42nd Annual Meeting on Association for Computational Linguistics. Association for Computational Linguistics, 2004, p. 55. Each acoustic unit, corresponding acoustic fingerprint and estimated probability of occurrence may be sent to a data store 140. The data store 140 may store the received data as data triples comprising an acoustic unit, corresponding acoustic fingerprint and estimated probability of occurrence.

The finite state transducer trainer 150 may receive (stage D) at least a portion of the stored data triples in the data store 140. The finite state transducer trainer 150 may efficiently encode the received data in a finite state transducer system for speech synthesis (stage E). For example, the finite state transducer system may comprise a first transducer configured to determine the probabilities of all audio unit sequences occurring in a corpus of text, and a second configured to determine the probabilities of phonemes occurring given the acoustic unit sequences. By composing both transducers, for example, a final transducer is obtained through which the best path of acoustic units can be determined. Any appropriate standard speech recognition decoding techniques can be applied in order to produce an audio output comprising an optimal sequence of acoustic units which are concatenated to produce the final output.

The system may further include an updated training utterances database 160 of acoustic units. The updated training utterances database 160 may include, for example, recorded utterances that can be stored with linguistic data, wherein each recorded utterance may be segmented into individual acoustic units. In some embodiments, the training utterances database 110 may be augmented and the updated training utterances database 160 may introduce additional, new acoustic units that did not exist prior to the database update and therefore do not have an associated probability of occurrence stored in the data store 140. In other embodiments, some acoustic units stored in the training utterances database 110 may have been deleted and the updated training database 110 may have been reduced.

The acoustic feature extractor 120 may access the updated training utterances database 160 (stage F) and index the acoustic units according to some acoustic unit identity. For example, the acoustic unit identities can be assumed to take some sequential integer identities. The acoustic feature extractor 120 may also include a fingerprinter 121 that can generate an acoustic fingerprint for each new acoustic unit using an acoustic fingerprinting algorithm. The generated acoustic fingerprints may act as an index for the database of acoustic units.

The fingerprint similarity engine 170 may receive the new, updated acoustic units and their corresponding acoustic fingerprints from the acoustic feature extractor 120 (stage G). The fingerprint similarity engine 170 can access the data store 140 and may compare the newly received updated acoustic fingerprints to the originally generated acoustic fingerprints stored in the data store 140. The fingerprint similarity engine may define a similarity measure and calculate the similarity measure between acoustic fingerprints. The fingerprint similarity engine may then accordingly identify an original acoustic unit whose corresponding acoustic fingerprint is indicated as similar to the fingerprint of the new acoustic unit. Many acoustic similarity measures between the acoustic fingerprints may be employed, for example a Hamming distance. The Hamming distance may calculate the similarity between acoustic fingerprints represented as vectors of integers by performing a XOR logical operation between their respective bit representations and counting the number of bit errors.

The prior probability assigner 180 may receive the set of new acoustic units (stage H) and identify similar acoustic fingerprints from the fingerprint similarity engine. The prior probability assigner may also access the data store 140 and may identify the probability estimates developed by the probability estimator 130 that correspond to the set of identified similar acoustic fingerprints received from the fingerprint similarity engine. The probability assigner may then assign the identified probability estimates to the new acoustic units. Each new acoustic unit, acoustic fingerprint and assigned probability of occurrence may be sent to a data store 190. The data store 190 may store the received data (stage I) as data triples comprising an acoustic unit, acoustic fingerprint and assigned probability of occurrence.

The finite state transducer trainer 150 may also receive at least a portion of the stored data triples in the data store 190 (stage J). The finite state transducer trainer may efficiently encode the received data in a finite state transducer system for speech synthesis (stage K).

Different configurations of the system 100 may be used where functionality of the training utterances database 110, updated training utterances database 160, acoustic feature extractor 120, probability estimator 130, fingerprint similarity engine 170, prior probability assigner 180, fingerprint-audio-probability triple databases 140 and 190 and finite state transducer trainer 150 may be combined, further distributed, or interchanged. The system 100 may be implemented in a single device or distributed across multiple devices.

Figure 2:
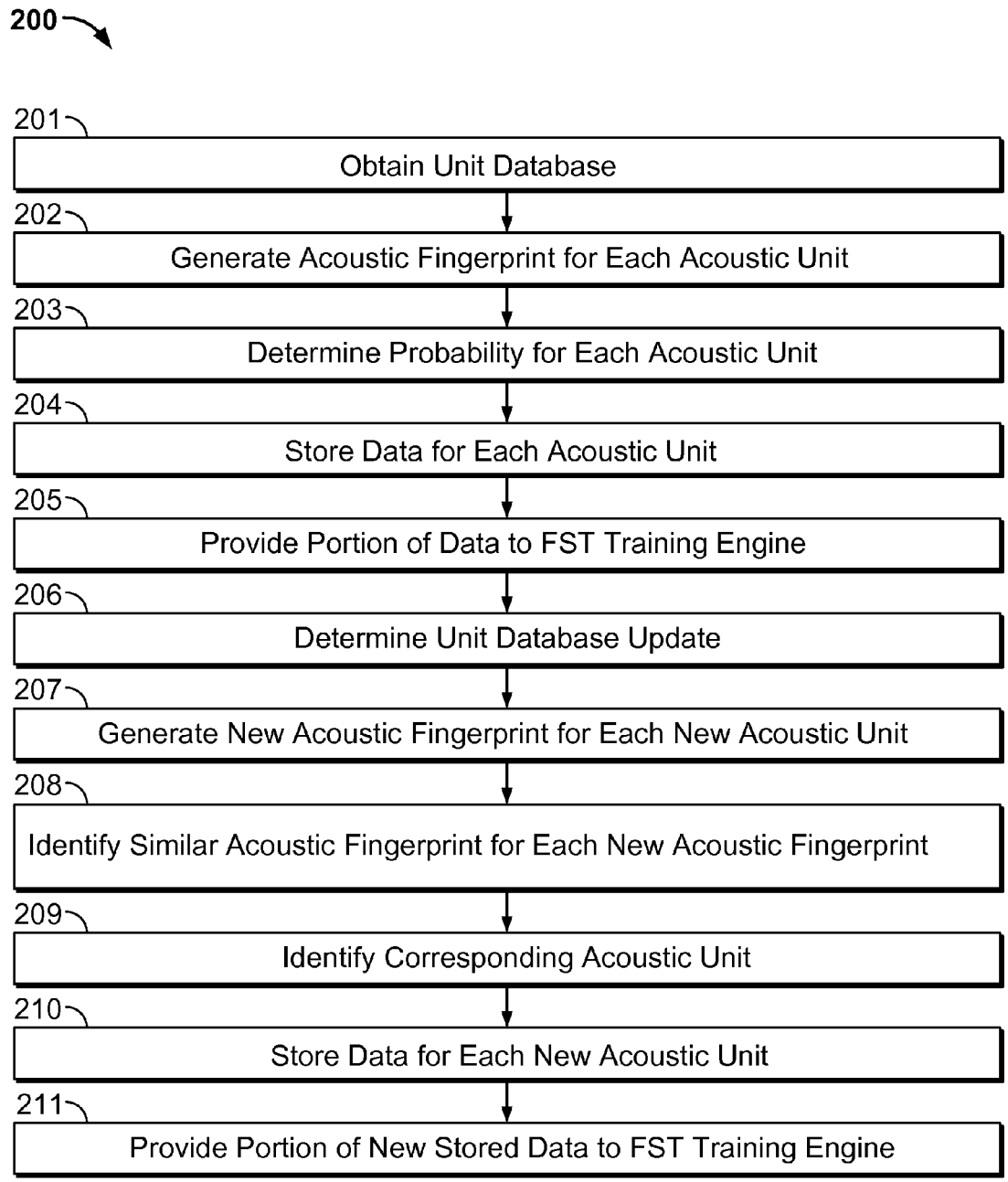
FIG. 2 is a flowchart of an example process of unit selection language modeling based on acoustic fingerprinting.

FIG. 2 is a flowchart of an example process 200 for unit selection language modeling based on acoustic fingerprinting. The following describes the process 200 as being performed by components of the system 100 that are described with reference to FIG. 1. However, the process 200 may be performed by other systems or system configurations.

The process 200 may include obtaining an acoustic unit database of acoustic units and, for each acoustic unit, linguistic data corresponding to the acoustic unit (201). In some embodiments, the acoustic unit database may be created offline using an existing very high-quality synthesis engine that synthesizes a gigantic corpus of text, resulting in many sequences of acoustic units with corresponding linguistic information. Each acoustic unit may be associated with a hard-coded, database-specific unit identifier.

The process 200 may include, for each acoustic unit in the database 110, generating an acoustic fingerprint (202). For example, the acoustic feature extractor 120 may include a fingerprinter 121 that can derive an acoustic fingerprint $a_u$ for each acoustic unit u using any acoustic fingerprinting algorithm, for example an algorithm that satisfies Equation (1), below.

$$\underline{a}(u)=[a_1(u),\ldots,a_n(u)] \tag{1}$$

In Equation (1), for a given unit u comprised of l frames, an acoustic fingerprint $\underline{a}(u)$ is given by a (finite) sequence of n integers $\{a_i(u)\}$. The process may include performing a one-to-one mapping of the acoustic unit database-specific unit identifiers to the respective acoustic fingerprints uniquely identifying individual acoustic units.

The process 200 may include, for each acoustic unit in the database 110, determining a probability of the linguistic data corresponding to the acoustic unit occurring in a text corpus (203). For example, the probability estimator 130 may receive the acoustic units and their corresponding indices and use standard statistical language modeling techniques to determine individual probability estimates of each acoustic unit occurring in some corpus of text, thus determining a complete probabilistic language model. One example of such a statistical language modeling approach employs the following approximation using the n-grams. That is, given a particular unit sequence $u_1, \ldots, u_k$, deriving accurate probabilities for the sequence using n-gram modeling as in Equation (2).

$$P(u_1,\ldots,u_k) \approx \prod_{i=1}^{k} P(u_i | u_{i-n-1},\ldots,u_{i-1}), \tag{2}$$

In Equation (2), u∈U refer to individual units from the unit database U from a high quality unit selection voice. The universe of these estimated unit transition probabilities comprise the probabilistic language model P(u). Because the corpus of text used to create the acoustic unit database may be enormous, the probabilistic language model may be estimated reliably.

The process 200 may include, for each acoustic unit in the database 110, storing data that associates the acoustic unit with (i) the acoustic fingerprint of the acoustic unit, and (ii) the probability of the linguistic data corresponding to the acoustic unit occurring in the text corpus (204). For example, the data store 140 may receive the estimated probabilities calculated by the probability estimator 130 along with the associated acoustic units and acoustic fingerprints. The data store 140 may store the received data in data triples corresponding to each acoustic unit.

The process 200 may include providing at least a portion of the stored data in the unit database to a finite state transducer training engine that is configured to train one or more finite state transducers that are used in generating speech from text (205). The finite state transducer trainer 150 may implement the data triples and, in turn, the determined probabilistic language model, in an efficient finite state transducer framework to produce an efficient, statistically principled method to perform acoustic unit selection and speech synthesis.

The process 200 may include determining that the unit database of acoustic units has been updated (206) to include one or more new acoustic units u'∈U. For example, in some production environments linguistic and acoustic changes to the recorded training utterances database can be frequent, and often results are expected to be live in extremely short time frames. In some embodiments, the unit database of acoustic units may be augmented to include new acoustic units that did not exist prior to the database update. The updated acoustic units may be stored in an updated audio unit database of acoustic units 160. If the database is updated, a similar mapping as described above may be performed, which may allow for an updated probabilistic language model without having to go through the incredibly time consuming process of reconstructing the database 140 that corresponds to the new version of the database.

The process 200 may include, for each new acoustic unit in the database 160, generating an acoustic fingerprint $a_i(u')$ for each new acoustic unit u' using any acoustic fingerprinting algorithm (207). The process may include performing a one-to-one mapping of the acoustic unit database-specific unit identifiers to the respective acoustic fingerprints uniquely identifying individual acoustic units.

The process 200 may include, for each new acoustic unit in the database 160, identifying an existing acoustic unit that (i) has an acoustic fingerprint that is indicated as similar to the fingerprint of the new acoustic unit, and (ii) has an associated probability stored in the unit database (208). A similar acoustic fingerprint is defined as in Equation (3).

$$\hat{a}(u') = \underset{u \in U}{\operatorname{argmin}} D(a(u'), a(u)) \qquad (3)$$

In Equation (3) D(a(u'),a(u)) is a similarity measure. The fingerprint similarity engine 170 may define a similarity measure between acoustic fingerprints. The simplest similarity measure between acoustic fingerprints is a Hamming distance measuring the minimum number of errors that could have transformed one fingerprint into another. The Hamming distance provides a robust measure of similarity.

The fingerprint similarity engine 170 may have access to the stored data triples in the data store 140 and use the similarity measure to identify an original acoustic unit that has a similar acoustic fingerprint to the acoustic fingerprint of the new acoustic unit (209). The probability assigner 180 may also access the data store 140. The probability assigner may receive the identified original acoustic unit that has a similar acoustic fingerprint to the acoustic fingerprint of the new acoustic unit and identify the corresponding probability estimate stored in the database 140. That is the system estimates the probability as given in Equation (4).

$$P(u'_1, \ldots, u'_k) = P(a_1(u'), \ldots, a_k(u')) \qquad (4)$$

In Equation (4) the system then fetches the probabilities of the sequence of nearest fingerprints $P(\hat{a}_1(u'), \ldots, \hat{a}_k(u'))$.

The process 200 may include, for each acoustic unit in the database 110, storing data that associates the new acoustic unit with (i) the acoustic fingerprint of the new acoustic unit, and (ii) the probability associated with the acoustic unit that has the acoustic fingerprint that is indicated as similar to the fingerprint of the new acoustic unit (210). For example, the data store 190 may receive the assigned probabilities calculated by the prior probability assigner 180 along with the new acoustic units and new acoustic fingerprints. The data store 190 may store the received data in data triples corresponding to each acoustic unit.

The process 200 may include also providing at least a portion of the stored data in the updated unit database to a finite state transducer training engine that is configured to train one or more finite state transducers that are used in generating speech from text (211). For example, the finite state transducer trainer 150 may implement the data triples and, in turn, the determined probabilistic language model, in an efficient finite state transducer framework to produce an efficient, statistically principled method to perform acoustic unit selection and speech synthesis. The probabilistic language model P(u) may be very efficiently encoded in a finite state transducer framework that offers many attractive features exploited during the runtime stage. During the runtime stage, it is easy to perform single-best or n-best search through the resulting transducer to obtain the most optimal sequence of acoustic units that need to be selected for speech synthesis. The runtime stage is very efficient and can perform extremely well.

Figure 3:
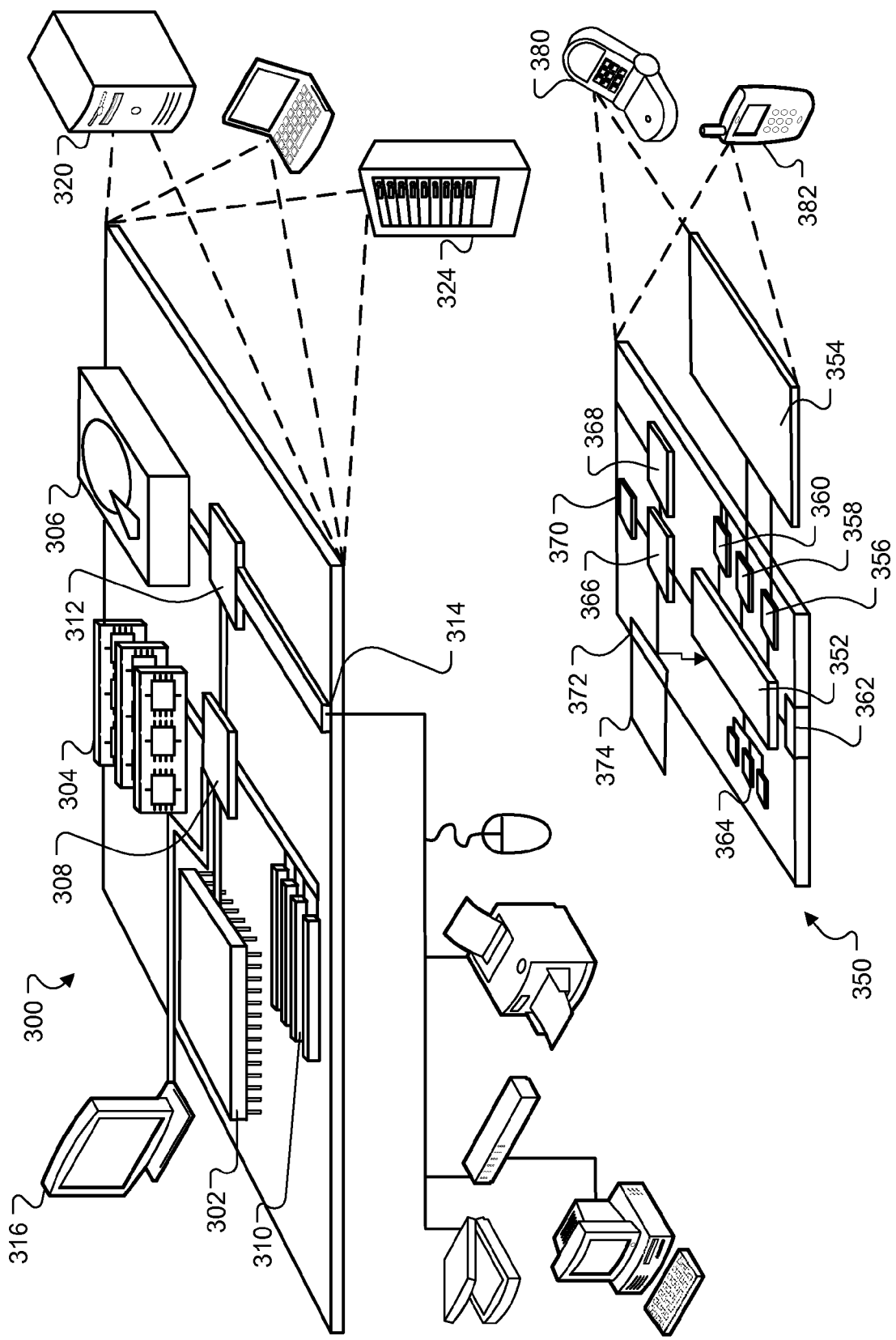
FIG. 3 is a diagram showing an example of a system that may be used to implement the systems and methods described in this document.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate.

The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analogue and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method comprising:
accessing a unit database of acoustic units and, for each acoustic unit, linguistic data corresponding to the acoustic unit;
for each acoustic unit:
generating an acoustic fingerprint;
determining a probability of the linguistic data corresponding to the acoustic unit occurring in a text corpus; and
storing data that associates the acoustic unit with (i) the acoustic fingerprint of the acoustic unit and (ii) the probability of the linguistic data corresponding to the acoustic unit occurring in the text corpus;
providing at least a portion of the stored data to a finite state transducer training engine that is configured to train one or more finite state transducers that are used in generating speech from text;
determining that the unit database of acoustic units has been updated to include one or more new acoustic units that do not have an associated probability of the linguistic data corresponding to the acoustic unit occurring in the text corpus;
for each new acoustic unit in the updated unit database:
generating an acoustic fingerprint for the new acoustic unit;
identifying an acoustic unit that (i) has an acoustic fingerprint that is indicated as similar to the fingerprint of the new acoustic unit, and (ii) has a stored associated probability; and
storing data that associates the new acoustic unit with (i) the acoustic fingerprint of the new acoustic unit and (ii) the probability associated with the acoustic unit that has the acoustic fingerprint that is indicated as similar to the fingerprint of the new acoustic unit; and
providing at least a portion of the new stored data to the finite state transducer training engine.

2. The method of claim 1, wherein the generated acoustic fingerprint for each acoustic unit indexes the unit database.

3. The method of claim 1, wherein the linguistic data is a tri-phone.

4. The method of claim 1, wherein the unit database is considered to be updated when new acoustic units have been added or existing acoustic units have been deleted.

5. The method of claim 1, wherein a new acoustic unit is an acoustic unit that did not exist prior to the database update.

6. The method of claim 1, wherein identifying an acoustic unit that has an acoustic fingerprint that is indicated as similar to the fingerprint of the new acoustic unit comprises:
calculating a respective similarity measure between the acoustic fingerprints of the new acoustic units and the acoustic fingerprints of each other acoustic unit in the unit database;
determining a nearest acoustic fingerprint to the acoustic fingerprint of the new acoustic units according to the similarity measure; and
identifying the acoustic unit associated with the nearest acoustic fingerprint.

7. The method of claim 6, wherein the similarity measure is a Hamming distance measuring the minimum number of errors that could have transformed one fingerprint into another.

8. A system comprising:
one or more computers and one or more storage devices storing instructions that are operable, when executed by the one or more computers, to cause the one or more computers to perform operations comprising:

accessing a unit database of acoustic units and, for each acoustic unit, linguistic data corresponding to the acoustic unit;

for each acoustic unit:

generating an acoustic fingerprint;

determining a probability of the linguistic data corresponding to the acoustic unit occurring in a text corpus; and storing data that associates the acoustic unit with (i) the acoustic fingerprint of the acoustic unit and (ii) the probability of the linguistic data corresponding to the acoustic unit occurring in the text corpus;

providing at least a portion of the stored data to a finite state transducer training engine that is configured to train one or more finite state transducers that are used in generating speech from text;

determining that the unit database of acoustic units has been updated to include one or more new acoustic units that do not have an associated probability of the linguistic data corresponding to the acoustic unit occurring in the text corpus;

for each new acoustic unit in the updated unit database:

generating an acoustic fingerprint for the new acoustic unit;

identifying an acoustic unit that (i) has an acoustic fingerprint that is indicated as similar to the fingerprint of the new acoustic unit, and (ii) has a stored associated probability; and storing data that associates the new acoustic unit with (i) the acoustic fingerprint of the new acoustic unit and (ii) the probability associated with the acoustic unit that has the acoustic fingerprint that is indicated as similar to the fingerprint of the new acoustic unit; and providing at least a portion of the new stored data to the finite state transducer training engine.

9. The system of claim 8, wherein the generated acoustic fingerprint for each acoustic unit indexes the unit database.

10. The system of claim 8, wherein the linguistic data is a tri-phone.

11. The system of claim 8, wherein the unit database is considered to be updated when new acoustic units have been added or existing acoustic units have been deleted.

12. The system of claim 8, wherein a new acoustic unit is an acoustic unit that did not exist prior to the database update.

13. The system of claim 8, wherein identifying an acoustic unit that has an acoustic fingerprint that is indicated as similar to the fingerprint of the new acoustic unit comprises:

calculating a respective similarity measure between the acoustic fingerprints of the new acoustic units and the acoustic fingerprints of each other acoustic unit in the unit database;

determining a nearest acoustic fingerprint to the acoustic fingerprint of the new acoustic units according to the similarity measure; and identifying the acoustic unit associated with the nearest acoustic fingerprint.

14. The system of claim 8, wherein the similarity measure is a Hamming distance measuring the minimum number of errors that could have transformed one fingerprint into another.

15. A non-transitory computer-readable medium storing software comprising instructions executable by one or more computers which, upon such execution, cause the one or more computers to perform operations comprising:

accessing a unit database of acoustic units and, for each acoustic unit, linguistic data corresponding to the acoustic unit;

for each acoustic unit:

generating an acoustic fingerprint;

determining a probability of the linguistic data corresponding to the acoustic unit occurring in a text corpus; and storing data that associates the acoustic unit with (i) the acoustic fingerprint of the acoustic unit and (ii) the probability of the linguistic data corresponding to the acoustic unit occurring in the text corpus;

providing at least a portion of the stored data to a finite state transducer training engine that is configured to train one or more finite state transducers that are used in generating speech from text;

determining that the unit database of acoustic units has been updated to include one or more new acoustic units that do not have an associated probability of the linguistic data corresponding to the acoustic unit occurring in the text corpus;

for each new acoustic unit in the updated unit database:

generating an acoustic fingerprint for the new acoustic unit;

identifying an acoustic unit that (i) has an acoustic fingerprint that is indicated as similar to the fingerprint of the new acoustic unit, and (ii) has a stored associated probability; and storing data that associates the new acoustic unit with (i) the acoustic fingerprint of the new acoustic unit and (ii) the probability associated with the acoustic unit that has the acoustic fingerprint that is indicated as similar to the fingerprint of the new acoustic unit; and providing at least a portion of the new stored data to the finite state transducer training engine.

16. The medium of claim 15, wherein the unit database is considered to be updated when new acoustic units have been added or existing acoustic units have been deleted.

17. The medium of claim 15, wherein identifying an acoustic unit that has an acoustic fingerprint that is indicated as similar to the fingerprint of the new acoustic unit comprises:

calculating a respective similarity measure between the acoustic fingerprints of the new acoustic units and the acoustic fingerprints of each other acoustic unit in the unit database;

determining a nearest acoustic fingerprint to the acoustic fingerprint of the new acoustic units according to the similarity measure; and identifying the acoustic unit associated with the nearest acoustic fingerprint.

* * * * *